(12) United States Patent
Esale et al.

(10) Patent No.: US 9,590,845 B1
(45) Date of Patent: *Mar. 7, 2017

(54) INTER-AREA LDP NODE PROTECTION

(71) Applicant: Juniper Networks, Inc., Sunnyvale, CA (US)

(72) Inventors: Santosh Esale, Sunnyvale, CA (US); Raveendra Torvi, Nashua, NH (US); Yakov Rekhter, New York, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,829

(22) Filed: Dec. 30, 2014

(51) Int. Cl.
*G01R 31/08* (2006.01)
*H04L 12/24* (2006.01)
*H04L 12/723* (2013.01)

(52) U.S. Cl.
CPC ......... *H04L 41/0668* (2013.01); *H04L 41/24* (2013.01); *H04L 45/50* (2013.01)

(58) Field of Classification Search
CPC ...... H04L 41/0668; H04L 45/50; H04L 41/24
USPC ................................. 370/217, 218, 221, 225
See application file for complete search history.

(56) References Cited

U.S. PATENT DOCUMENTS

| | | | |
|---|---|---|---|
| 7,184,437 B1 | 2/2007 | Cole et al. | |
| 7,626,925 B1 * | 12/2009 | Sivabalan | H04J 3/14 370/228 |
| 8,077,726 B1 | 12/2011 | Kumar et al. | |
| 8,339,959 B1 | 12/2012 | Moisand et al. | |
| 2006/0203720 A1 * | 9/2006 | Kano | H04L 41/0663 370/228 |
| 2006/0268682 A1 * | 11/2006 | Vasseur | H04L 12/5695 370/216 |
| 2008/0170493 A1 | 7/2008 | Vasseur | |
| 2010/0106999 A1 | 4/2010 | Hanif | |
| 2010/0157794 A1 | 6/2010 | Nakash | |
| 2012/0218884 A1 * | 8/2012 | Kini | H04L 45/22 370/228 |
| 2013/0010589 A1 * | 1/2013 | Kini | H04L 45/50 370/219 |
| 2013/0208582 A1 | 8/2013 | Wijnands | |
| 2013/0301403 A1 | 11/2013 | Esale et al. | |
| 2014/0313886 A1 | 10/2014 | Yuan et al. | |
| 2015/0092776 A1 | 4/2015 | Wijnands | |
| 2015/0215201 A1 | 7/2015 | Nakash | |
| 2016/0119821 A1 | 4/2016 | Ramachandran et al. | |

OTHER PUBLICATIONS

Andersson et al., "LDP Specification," Network Working Group, RFC 5036, Standards Track, Oct. 2007, 136 pp.

(Continued)

*Primary Examiner* — Mang Yeung
(74) *Attorney, Agent, or Firm* — Shumaker & Sieffert, P.A.

(57) ABSTRACT

Techniques are described for providing fast reroute inter-area node protection for label switched paths (LSPs) using label distribution protocol (LDP). In one example, a network device may be configured to determine that a protected node is an area border router, and use network topology information, obtained by an Interior Gateway Protocol (IGP) executing on the network device, to identify a second area border router in the same IGP area as the protected node, to which to automatically establish a bypass LSP and a targeted LDP session.

19 Claims, 5 Drawing Sheets

(56) References Cited

OTHER PUBLICATIONS

Esale et al., "Application-aware Targeted LDP," draft-esale-mpls-app-aware-tldp-02, MPLS Working Group, Internet-Draft, Nov. 22, 2014, 18 pp.
Esale et al., "Applications Aware LDP Targeted Session," draft-esale-mpls-appl-aware-ldp-targeted-session-00, MPLS Working Group, Internet Draft, Apr. 2014, 12 pp.
Pan et al., "Fast Reroute Extensions to RSVP-TE for LSP Tunnels," Network Working Group, RFC 4090, Standards Track, May 2005, 39 pp.
Rosen et al., "Multiprotocol Label Switching Architecture," Network Working Group, RFC 3031, Standards Track, Jan. 2001, 57 pp.
Shen et al., "Discovering LDP Next-Nexthop Labels," draft-shen-mpls-ldp-nnhop-lable-02.txt, Network Working Group, Internet Draft, Nov. 2005, 8 pp.
U.S. Appl. No. 14/320,242, by Santosh Esale, filed Jun. 30, 2014.
U.S. Appl. No. 14/586,809, by Santosh Esale, filed Dec. 30, 2014.
Amendment in Response to Office Action mailed Jul. 19, 2016, from U.S. Appl. No. 14/586,809, filed Oct. 19, 2016, 13 pp.
Office Action from U.S. Appl. No. 14/586,809, dated Jul. 19, 2016, 12 pp.
Notice of Allowance and Interview Summary from U.S. Appl. No. 14/586,809, mailed Nov. 10, 2016, 12 pp.
Corrected Notice of Allowance from U.S. Appl. No. 14/586,809, mailed Nov. 30, 2016, 2 pp.

\* cited by examiner

INTER-AREA LDP NODE PROTECTION

TECHNICAL FIELD

The disclosure relates to packet-based computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as a link state protocol Interior Gateway Protocol (IGP).

The connection between two devices on a network is generally referred to as a link. A link state protocol, as one type of IGP, allows routers to exchange and accumulate information describing the various links within the network. With a typical link state routing protocol, the routers exchange information related to available interfaces, metrics and other variables associated with network links. This allows a router to construct its own topology or map of the network. Some examples of link state protocols include the Open Shortest Path First (OSPF) protocol and the Intermediate-System to Intermediate System (IS-IS) protocol.

Upon failure of a link or failure of a node interfacing with the link, routers in the network transmit new connectivity information to neighboring devices, allowing each device to update its local routing table. When a link or node in the network fails, routers using traditional link state protocols may take a long time to adapt their forwarding tables in response to the topological change resulting from link and node failures in the network. The process of adapting the forwarding tables is known as convergence. This time delay occurs because recovery from a failure requires each router to re-compute the shortest path algorithm to calculate the next hop for the affected routers in the network. Until the next hops are re-computed, traffic being sent toward the failed link or node may be dropped.

SUMMARY

In general, this disclosure describes techniques for providing fast reroute intra-area node protection for label switched paths (LSPs) using label distribution protocol (LDP). This disclosure also describes techniques for providing inter-area node protection for LSPs using LDP. In one example, a point of local repair (PLR) network device may be configured to use network topology information, obtained by an Interior Gateway Protocol (IGP) executing on the network device, to identify a next next hop merge point to which to automatically establish a bypass LSP, and to which to establish a targeted LDP session for obtaining a label advertised by the next next hop merge point. This can allow the PLR network device to provide intra-area node protection. In another example, the PLR network device may be configured such that when the PLR determines that a protected node is an area border router, the PLR network device is configured to use network topology information, obtained by the IGP executing on the network device, to identify a second area border router in the same IGP area as the protected node, to which to automatically establish a bypass LSP and a targeted LDP session. This can allow the PLR network device to provide inter-area node protection.

The techniques of this disclosure may provide one or more advantages. For example, the techniques of this disclosure allow network devices to provide node protection using LDP in most network topologies, including in network topologies in which LDP node protection would not otherwise be available. The techniques of this disclosure enable node protection to be used for fast reroute of LSP traffic until a convergence process completes for a new path through the network. The techniques may therefore reduce packet loss that might otherwise occur while a routing protocol on the routers from the PLR network device to an egress router of the LSP converge on a new path in the new network topology. The techniques can be used by network devices without requiring extensions to LDP.

In one example, a method includes by a network device, identifying, based on network topology information obtained by an interior gateway protocol (IGP) executed by the network device, a potential next next hop merge point network device that is (i) in an IGP area in which the PLR network device is positioned and (ii) along a path that avoids a given protected node within the IGP area; by the network device, automatically establishing a bypass label switched path (LSP) to the potential next next hop merge point network device, wherein the bypass LSP follows a path that avoids the protected node, and by the network device, automatically establishing a targeted label distribution protocol (LDP) session to the potential next next hop merge point network device. The method also includes, by the network device, obtaining a label mapping from the potential next next hop merge point network device using the targeted LDP session, and by the network device, programming forwarding information to include a backup path to the potential next next hop merge point network device with a label stack having an inner label from the obtained label mapping for the potential next next hop merge point network device and an outer label for the bypass LSP to the potential next next hop merge point network device.

In another example aspect, a network device includes a hardware-based processor, an interior gateway protocol (IGP) executing on the hardware-based processor, wherein the IGP is configured to obtain network topology information, and a Resource Reservation Protocol with Traffic Engineering extensions (RSVP-TE) module executing on the hardware-based processor, wherein the RSVP-TE module is configured to identify, based on the network topology information, a potential next next hop merge point network device that is (i) in an IGP area in which the PLR network device is positioned and (ii) along a path that avoids a given protected node within the IGP area. The RSVP-TE module is configured to automatically establish a bypass label switched path (LSP) to the potential next next hop merge point network device, wherein the bypass LSP follows a path that avoids the protected node. The network device also includes a label distribution protocol (LDP) module executing on the hardware-based processor, wherein the LDP module is configured to automatically establish a targeted label distribution protocol (LDP) session to the potential next next hop merge point network device, obtain a label mapping from the potential next next hop merge point network device using the targeted LDP session, and program forwarding information to include a backup path to the potential next next hop merge point network device with a label stack having an inner label from the obtained label mapping for the potential next next hop merge point network device and an outer label for the bypass LSP to the potential next next hop merge point network device.

In a further example aspect, a computer-readable storage medium includes instructions for causing a programmable processor of a network device to identify, based on network topology information obtained by an interior gateway protocol (IGP) executed by the network device, a potential next next hop merge point network device that is (i) in an IGP area in which the PLR network device is positioned and (ii) along a path that avoids a given protected node within the IGP area, automatically establish a bypass label switched path (LSP) to the potential next next hop merge point network device, wherein the bypass LSP follows a path that avoids the protected node, automatically establish a targeted label distribution protocol (LDP) session to the potential next next hop merge point network device, obtain a label mapping from the potential next next hop merge point network device using the targeted LDP session, and program forwarding information to include a backup path to the potential next next hop merge point network device with a label stack having an inner label from the obtained label mapping for the potential next next hop merge point network device and an outer label for the bypass LSP to the potential next next hop merge point network device.

In another example, a method includes by a network device, determining, based on network topology information obtained by an interior gateway protocol (IGP) executed by the network device, that a protected node along a primary LSP is a first area border router, wherein the protected node is in an IGP area in which the network device is positioned, and in response to determining that the protected node is a first area border router, by the network device, identifying a second area border router in the IGP area in which the network device and the protected node are positioned. The method also includes by the network device, automatically establishing a bypass label switched path (LSP) to the second area border router, wherein the bypass LSP follows a path that avoids the protected node, by the network device, automatically establishing a targeted label distribution protocol (LDP) session to the second area border router, by the network device, obtaining a label mapping from the second area border router using the targeted LDP session, and by the network device, programming stored forwarding information to include a backup path to the second area border router with a label stack having an inner label from the obtained label mapping for the second area border router and an outer label for the bypass LSP to the second area border router.

In another example aspect, a network device includes a hardware-based processor, an interior gateway protocol (IGP) module executing on the hardware-based processor, wherein the IGP module is configured to obtain network topology information, and a Resource Reservation Protocol with Traffic Engineering extensions (RSVP-TE) module executing on the hardware-based processor, wherein the RSVP-TE module is configured to determine, based on the network topology information, that a protected node along a primary LSP is a first area border router, wherein the protected node is in an IGP area in which the network device is positioned, and in response to determining that the protected node is a first area border router, identify a second area border router in the IGP area in which the network device and the protected node are positioned. The RSVP-TE module is configured to automatically establish a bypass label switched path (LSP) to the second area border router, wherein the bypass LSP follows a path that avoids the protected node. The network device also includes a label distribution protocol (LDP) module executing on the hardware-based processor, wherein the LDP module is configured to automatically establish a targeted label distribution protocol (LDP) session to the second area border router, obtain a label mapping from the second area border router using the targeted LDP session, and program stored forwarding information to include a backup path to the second area border router with a label stack having an inner label from the obtained label mapping for the second area border router and an outer label for the bypass LSP to the second area border router.

In a further example aspect, a computer-readable storage medium includes instructions for causing a programmable processor of a network device to determine, based on network topology information obtained by an interior gateway protocol (IGP) executed by the network device, that a protected node along a primary LSP is a first area border router, wherein the protected node is in an IGP area in which the network device is positioned, in response to determining that the protected node is a first area border router, identify a second area border router in the IGP area in which the network device and the protected node are positioned, automatically establish a bypass label switched path (LSP) to the second area border router, wherein the bypass LSP follows a path that avoids the protected node, automatically establish a targeted label distribution protocol (LDP) session to the second area border router, obtain a label mapping from the second area border router using the targeted LDP session, and program stored forwarding information to include a backup path to the second area border router with a label stack having an inner label from the obtained label mapping for the second area border router and an outer label for the bypass LSP to the second area border router.

The details of one or more examples are set forth in the accompanying drawings and the description below. Other features, objects, and advantages will be apparent from the description and drawings, and from the claims.

DETAILED DESCRIPTION

Figure 1:
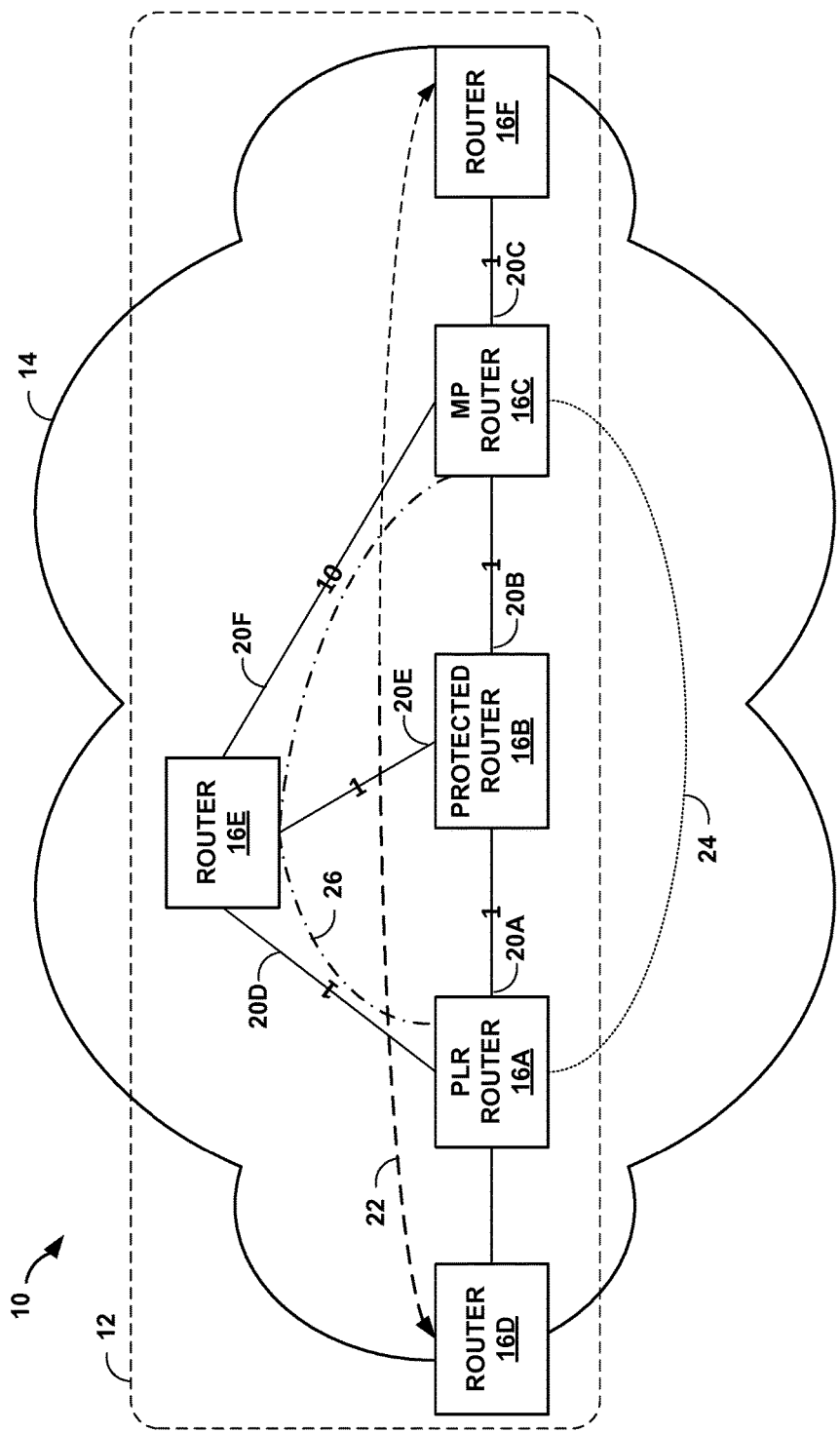
FIG. 1 is a block diagram illustrating an example system in which routers are configured to provide intra-area node protection when forwarding network traffic in accordance with the techniques of this disclosure.

FIG. 1 is a block diagram illustrating an example network system 10 in which routers 16A-16F ("routers 16") of network 14 are configured to provide intra-area node protection when forwarding network traffic (e.g., network packets) in accordance with one or more aspects of this disclosure. In the example of FIG. 1, all of routers 16 are positioned within a single Interior Gateway Protocol (IGP) area 12. An IGP area represents a network topology for which each router 16 in the IGP area possesses information. Areas may be grouped into larger areas called autonomous systems or routing domains. Autonomous systems, or routing domains, are systems of one or more IGPs that are autonomous from other systems of IGPs. IGP area 12 may, in some examples, be an autonomous system.

Each of routers 16 in area 12 executes at least one Interior Gateway Protocol to exchange routing information within the IGP area 12. Interior Gateway Protocols include, for example, link-state routing protocols such as Open Shortest Path First (OSPF) or Intermediate System to Intermediate System (IS-IS), and distance-vector routing protocols such as Routing Information Protocol (RIP) or Interior Gateway Routing Protocol (IGRP). The IGP area(s) in which each of routers 16 resides may be specified as a field in route tables maintained by each of routers 16. Some routers may reside within two IGP areas; these routers are called area border routers (ABRs). In the example of FIG. 1, routers 16D, 16E, or 16F could be ABRs, although for simplicity no areas besides area 12 are shown in FIG. 1.

In some examples, network 14 may be a service provider network. For example, network 14 may represent one or more networks owned and operated by a service provider (which is commonly a private entity) that offer one or more services for consumption by subscriber networks. In this context, network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

Each of routers 16 represents a network device that routes or otherwise forwards traffic through network 14. Typically, routers 16 represent a L3 packet-switching device that operates at L3 to exchange routing information using a routing protocol, such as an Interior Gateway Protocol (IGP), describing a current topology of network 14. Routers 16 may locally store network topology information in a link state database and/or traffic engineering database (TED). Routers 16 then process this routing information, selecting paths through its representation of the topology of network 14 to reach all available destinations to generate forwarding information. In other words, routers 16 reduce these paths to so-called "next hops" which identify interfaces to which to forward traffic destined for a particular destination, where the forwarding information includes this list of next hops. Routers 16 then install the forwarding information in a forwarding plane of the router, and the forwarding plane forwards received traffic in accordance with the forwarding information.

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System-Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generally as label switching routers (LSRs). In the example of FIG. 1, routers 16 are LSRs, and router 16D is the ingress router to LSP 22. Router 16F is the egress router to LSP 22. A set of packets to be forwarded along the LSP is referred to as a forwarding equivalence class (FEC). In general, each router along the LSP maintains a context that associates a FEC with an incoming label and an outgoing label. This association is referred to as a FEC-label binding. The ingress label edge router (LER) uses routing information, propagated from the egress LER, to determine the LSP, assign labels for the LSP, and affix a label to each packet of the FEC.

The LSRs use MPLS protocols to receive MPLS label mappings from downstream LSRs and to advertise MPLS label mappings to upstream LSRs. Using MPLS mechanisms, data packets are assigned labels to identify the FEC to which the packets belong, and forwarding decisions are made for the data packets based on the labels. The labels are included in MPLS headers used to encapsulate the packets for transport along the LSP. In some examples, the labels are "stacked" to establish segmented LSP tunnels in which multiple LSPs are nested together in order to reach an egress router of the last LSP on the label stack. When an LSR receives an MPLS packet from an upstream router, the LSR performs a lookup in the context and swaps the MPLS label(s) according to the information in its forwarding table based on the lookup and forwards the packet to the appropriate downstream LSR or LER. The egress LER (or in some cases, the penultimate router on the LSP) removes the label(s) from the packet and the egress LSR forwards the packet to its destination in accordance with non-label based packet forwarding techniques.

The LSRs may use LDP to distribute labels to other routers along hop-by-hop paths to establish LSPs. More specifically, the routers may distribute LDP label mapping messages indicating assigned labels and associated FECs for the LSPs. Two routers that use LDP to exchange label mapping information are referred to as LDP peer routers. Directly connected neighbor routers may be LDP peer routers with a direct LDP session. In the case where non-neighbor routers (i.e., routers that are not directly connected at the link level but which are reachable at the network level) want to be LDP peer routers, such as routers 16A and 16C, the non-neighbor routers may use the LDP extended discovery mechanism and establish a targeted LDP session 26, as described in further detail below. More information on LDP and targeted LDP sessions is described in Anderson, L., "LDP Specification," RFC 5036, October 2007, the entire contents of which are incorporated by reference herein. More information on MPLS is described in Rosen, E., "Multiprotocol Label Switching Architecture," RFC 3031, January 2001, the entire contents of which are incorporated by reference herein.

When an LSP such as LSP 22 is established, LSRs along the LSP may also establish one or more bypass LSPs to provide link and/or node protection for the LSP. Router 16A is a point of local repair (PLR) router along the path of LSP 22. In the example of FIG. 1, PLR router 16A is a transit router, i.e., an intermediate router along LSP 22 and is neither an ingress router nor an egress router of LSP 22. In other examples, PLR router 16A may be both the PLR and the ingress router of LSP 22. Router 16C is the merge point (MP) for bypass LSP 26. Bypass LSP 26 is an LSP that provides node protection for protected router 16B between PLR router 16A and MP router 16C along LSP 22, such that if protected router 16B should become unresponsive, PLR router 16A send the network traffic received on existing LSP 22 through the bypass LSP 26. Bypass LSP 26 follows a path from PLR router 16A to router 16E to MP router 16C, avoiding the protected resource (in this case, protected router 16B). When PLR router 16A detects that protected router 16B is unresponsive, PLR router 16A begins forwarding network traffic received from router 16D on LSP 22 on to bypass LSP 26. MP router 16C receives the network traffic on bypass LSP 26 from router 16B and forwards the traffic on the path of LSP 22 to router 16F. In some examples, PLR router 16A may have previously computed and signaled bypass LSP 26 as a backup path for protected router 16B using the Resource Reservation Protocol with Traffic Engineering extensions (RSVP-TE), prior to detecting any failure of protected router 16B. Router 16A may establish and use bypass LSP 26 in accordance with MPLS fast reroute techniques, as described in P. Pan, "Fast Reroute Extensions to RSVP-TE for LSP Tunnels," Network Working Group RFC 4090, May 2005, the entire contents of which are incorporated by reference herein. RFC 4090 describes a facility backup method which provides link or node protection by pre-calculating a bypass path for the set of LSPs traversing a link.

In some examples, router 16A may establish bypass LSP 26 upon receiving, from by ingress router 16D of LSP 22, a resource reservation request message that specifies a need for node protection. For example, during initial RSVP-TE signaling for establishing LSP 22, router 16A may receive an RSVP-TE PATH request from ingress router 16D that includes a fast reroute object in which a "node protection desired" flag, or other fast reroute flag, is set. In general, a router that receives a "node protection desired" flag will attempt to establish a bypass LSP. After router 16A establishes bypass LSP 26, router 16A maintains forwarding information in a data plane of router 16A that allows router 16A to send traffic through bypass LSP 26 if protected router 16B fails. Upon link failure, PLR router 16A redirects traffic over bypass LSP 26 from PLR router 16A to MP router 16C.

In some network topologies, it may not be possible for some LSRs to provide node protection using conventional LDP. In network 14 shown in FIG. 1, each of links 20A-20F has an associated weight (based on some metric). Links 20A-20E each have weight of 1, and link 20F has a weight of 10. In network 14, PLR router 16A can provide link protection for LSP 22 with respect to link 20A by sending traffic on the path PLR router 16A, router 16E, router 16B, MP router 16B. However, because the weight associated with link 20F is much higher than the other link 20 weights, in the absence of the techniques of this disclosure, LSRs 16 would select a path that goes through protected router 16B and would not be able send traffic on a path that avoids protected router 16B.

In accordance with the techniques of this disclosure, PLR router 16A is configured to discover MP router 16C as a next next hop and learn a label advertised by the next next hop MP router 16C to use for forwarding traffic along a path that bypasses protected router 16B. PLR router 16A is locally configured to determine whether a next hop/neighbor node needs node-protection based on local configuration. For example, one or more interfaces of PLR router 16A can be configured for node protection under an LDP hierarchy level. PLR router 16A may be configured to discover all possible next next hops (NNHs) of PLR router 16A that are in the same IGP area 12 as PLR router 16A and that avoid the protected router 16B. These possible next next hops are potential merge points for RSVP-TE LSPs that would serve as bypass LSPs to avoid protected router 16B. PLR router 16A may be configured to obtain these next next hops from a topology database, e.g., its stored TED or link state database populated with topology information obtained via IGP link state advertisements (LSAs) exchanged by PLR router 16A with IGP peer routers. In the example of FIG. 1, PLR router 16A identifies MP router 16C as a potential next next hop in IGP area 12 on a path that avoids protected router 16B (i.e., the path from PLR router 16A to router 16E to MP router 16C). In other network topologies, PLR router 16A may discover multiple possible next next hop MPs.

PLR router 16A automatically establishes a bypass LSP to each of the discovered next next hops, if a bypass LSP is not yet established. For example, PLR router 16A automatically establishes RSVP-TE bypass LSP 26 to MP router 16C, such as by sending an RSVP-TE PATH message to router 16E via link 20D. Router 16E reserves bandwidth in accordance with the bandwidth reservation request specified in the PATH message, and router 16E sends a resource reservation reply message (e.g., a RSVP-TE RESV message) to PLR router 16A indicating that the requested bandwidth has been reserved, and specifying a label (e.g., L1) for PLR router 16A to use in subsequently forwarding network traffic over bypass LSP 26. Router 16E also sends a RSVP-TE path message to MP router 16C via link 20F. MP router 16C reserves bandwidth in accordance with the bandwidth reservation request specified in the PATH message, and MP router 16C sends a resource reservation reply message (e.g., a RSVP-TE RESV message) to router 16E indicating that the requested bandwidth has been reserved, and specifying a label (e.g., L2) for router 16E to use in subsequently forwarding network traffic on bypass LSP 26.

In some examples, when establishing RSVP-TE bypass LSP, PLR router 16A may take into account a Shared Risk Link Group (SRLG) associated with the link between itself and the protected node. Specifically, when selecting a path on which to establish a bypass LSP, PLR router 16A may select a path that avoids traversing links that share one or more SRLGs with the link between itself and the protected node (e.g., link 20A).

PLR router 16A also signals a targeted LDP session to each of the identified next next hops. In some examples, PLR router 16A may establish the bypass LSP and signal the targeted LDP session to each of the identified next next hops in parallel. In the example of FIG. 1, PLR router 16A in network 14 uses the extended discovery mechanism of LDP to establish a targeted adjacency and subsequent targeted LDP session 24. PLR router 16A may initiate extended discovery by sending a targeted Hello message to a specific address, e.g., to the address of the identified next next hop MP router 16C, to establish a targeted adjacency. PLR router 16A can obtain the address (e.g., an IP address) for MP router 16C from the link state database of PLR router 16A. After establishing the targeted adjacency, PLR router 16A may send an LDP initialization message to MP router 16C along an IGP primary path to initiate establishment of targeted LDP session 24 between PLR router 16A and MP router 16C, for example. The IGP primary path may avoid the protected router, for example. PLR router 16A then obtains an LDP label advertised by MP router 16C from MP router 16C via targeted LDP session 24. For example, the LDP label advertised by MP router 16C may be label L21. MP router 16C automatically provides PLR router 16A with the label mapping after establishment of targeted LDP session 24. PLR router 16A stores the label information received from MP router 16C to its FIB.

Responsive to detecting a failed resource between PLR router 16A and MP router 16C (e.g., failure of protected router 16B, in the example of FIG. 1), PLR router 16A may perform a soft reroute action to reroute the traffic from LSP 22 onto the previously-established bypass LSP 26. For example, PLR router 16A may update its stored forwarding state to change the primary next hops for LSP 22, such as by setting a next hop for bypass LSP 26 as the primary next hop for traffic received for LSP 22. PLR router 16A can subsequently send traffic received on LSP 22 onto bypass LSP 26, and, in accordance with its stored forwarding information, PLR router 16A will use a label stack that includes the LDP label learned from its next next hop MP router 16C via the targeted LDP session 24. The label stack may include an inner label L21 and an outer label L1. The outer RSVP-TE LSP label L1 may be used by the LSRs in network 14 for forwarding traffic on the RSVP-TE bypass LSP 26 to router 16E.

When router 16E receives traffic from PLR router 16A bearing the label stack (outer label L1, inner label L21), router 16E may swap the outer label L1 for a different label (say, L2) advertised by MP router 16C when RSVP bypass LSP 26 was established, and router 16E leaves the inner LDP label L21 untouched. When MP router 16C receives the traffic from router 16E bearing the label stack (outer label L2, inner label L21), MP router 16C pops off the outer label L2, and uses inner label L21 to do a lookup in its forwarding table, and swaps the inner label L21 for a label L20, for example, which was advertised by router 16F (e.g., using LDP) as its loopback address.

In this manner, the techniques of this disclosure allow routers to provide node protection using LDP in most network topologies, including in network topologies in which LDP node protection would not otherwise be available. The techniques of this disclosure enable node protection to be used for fast reroute of LSP traffic until a convergence process completes for a new path through the network. The techniques may therefore reduce packet loss that might otherwise occur while a routing protocol converges on each of the routers 16 along the path of LSP 22.

In some examples, PLR router 16A may be configured to retain only mappings for intra-area FECs from its targeted LDP session with its next next hop (here, targeted LDP session 24 with next next hop MP router 16C), without retaining all FEC mappings. This may be done by adding an intra-area node protection application type to the approach described in S. Esale, "Application-aware Targeted LDP," MPLS Working Group Internet-Draft, draft-esale-mpls-app-aware-tldp-02, Nov. 22, 2014, the entire contents of which are incorporated by reference herein. See also U.S. Ser. No. 14/320,242, entitled APPLICATIONS-AWARE TARGETED LDP SESSIONS, filed Jun. 30, 2014, the entire contents of which are incorporated by reference herein. For example, PLR router 16A may be configured to initiate a targeted LDP session in a manner that includes information specifying one or more application for which the targeted LDP session is being initiated. LSRs may establish targeted LDP sessions to be used for various purposes, referred to herein as "applications." The applications may be forwarding functions used for forwarding network communications over the targeted LDP sessions.

For example, a sending LSR can send an LDP initialization message that includes a new type-length-value (TLV) referred to as a Targeted Application Capability (TAC) TLV that specifies one or more applications for which a targeted LDP session is proposed to be established. For example, when signaling the targeted LDP session with the next next hop, PLR router 16A may be configured to include within an LDP initialization message a targeted application capability (TAC) type-length-value (TLV) specifying intra-area node protection. Enabling LSRs to advertise Targeted Application Capability during session initialization can provide the receiver LSR with information about the targeted applications so the receiver LSR can control the acceptance of this session. If the receiving LSR determines that the initiated targeted LDP session is acceptable, the receiving LSR can reply with an LDP initialization message specifying one or more applications for which the receiving LSR is willing to establish the targeted LDP session. In this manner, the sending and receiving LSR peers can, during the LDP session initialization process, negotiate a set of Targeted Application Elements indicating a set of one or more applications for which both LSRs are willing to advertise state information over the resulting targeted LDP session.

Figure 2:
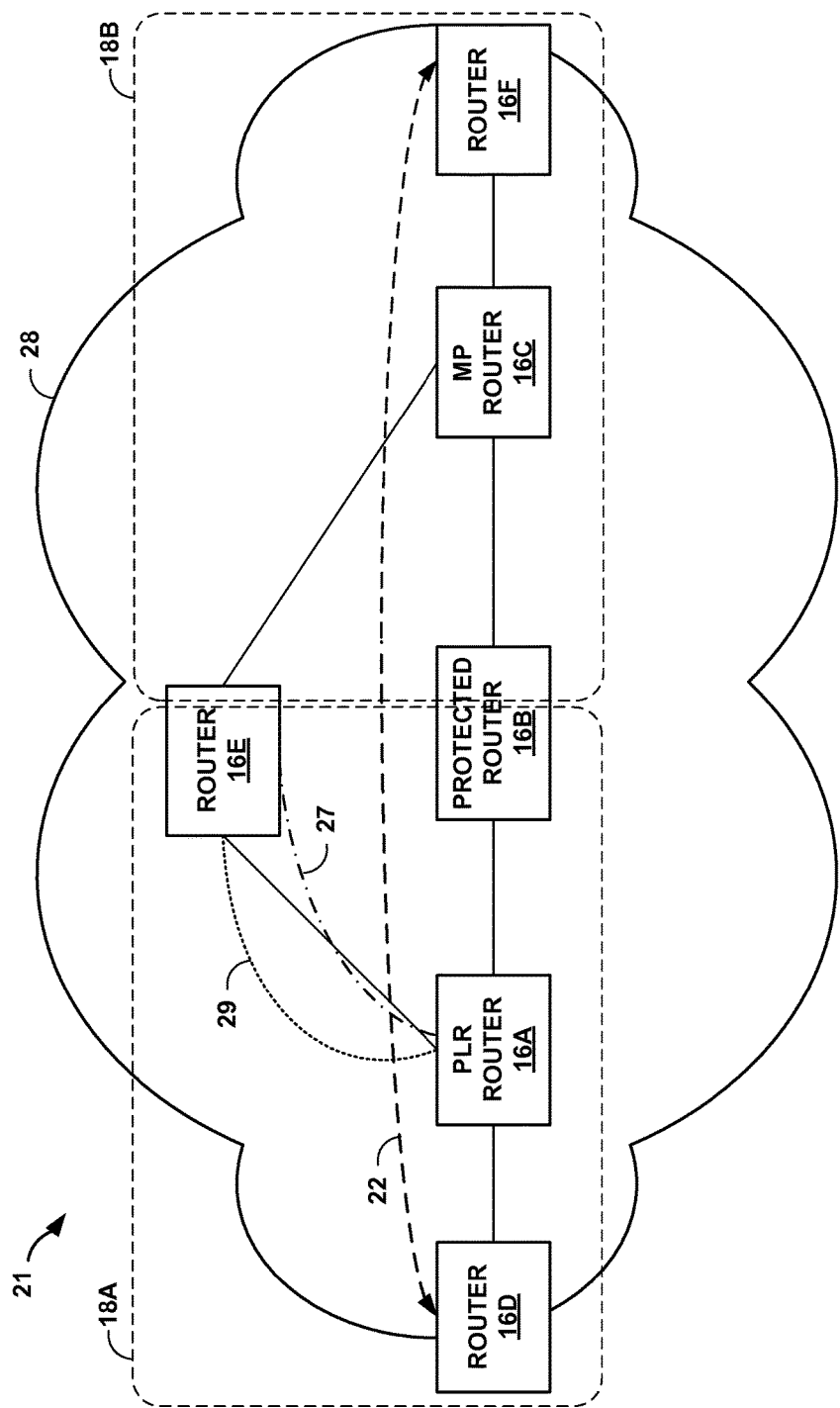
FIG. 2 is a block diagram illustrating an example system in which routers are configured to provide inter-area node protection when forwarding network traffic in accordance with the techniques of this disclosure.

FIG. 2 is a block diagram illustrating an example network system 21 in which routers 16 of network 14 are configured to provide inter-area node protection when forwarding network traffic (e.g., network packets) in accordance with one or more aspects of this disclosure. Network system 21 is similar to network system 10 of FIG. 1, but network system 21 includes two IGP areas 18A-18B ("IGP areas 18"). In the example of network system 21, some of routers 16 are positioned in IGP area 18A (e.g., router 16D and PLR router 16A), some are positioned only in IGP area 18B (e.g., MP router 16C and router 16F), and some of routers 16 are area border routers (ABRs) that are positioned in both of IGP areas 18A and 18B (e.g., router 16E and protected router 16B).

The techniques described with respect to FIG. 1 work well when the protected node is not an ABR for a given LSP bound to an IPv4/IPv6 prefix FEC. If protected router 16B is an ABR, as in FIG. 2, and protected router 16B advertises into IGP area 18A in which PLR router 16A is positioned that this prefix is reachable via some other IGP area 18B that the ABR protected router 16B is in, then the above techniques described above may not work, as the next next-hop to PLR router 16A for this prefix resides in a different IGP area 18B than PLR router 16A itself, and thus a Shortest Path First (SPF) calculation performed by PLR router 16A cannot determine the next next-hop.

To provide node protection for an ABR such as protected router 16B, in accordance with some aspects of the techniques of this disclosure, PLR router 16A is configured to identify all the LSPs bound to IPv4/IPv6 prefix FECs for which the ABR is the next hop. For each such prefix the ABR (using the information provided by the link state database), finds some other ABR that is in the same area as PLR router 16A and the protected ABR, such that this other ABR advertises inter-area reachability to the prefix. The other ABR is generally referred to herein as "other-ABR." In the example of FIG. 2, the other-ABR in the same area 18A as PLR router 16A and ABR protected router 16B is router 16E. Whether a router is an ABR may be indicated in an LSA advertised on an IGP session between routers, so PLR router 16A can determine whether a protected node is an ABR by consulting its link-state database, for example. In some examples, the IGP area(s) in which each of routers 16 resides may be specified as a field in route tables maintained by each of routers 16.

After identifying the other-ABR 16E, PLR router 16A establishes an RSVP-TE auto bypass LSP 27 to that other-ABR 16E, if a bypass LSP is not yet established, and also establishes a targeted LDP session 29 to that other-ABR 16E to learn a label advertised by the other-ABR 16E. PLR router 16A can automatically establish the RSVP-TE bypass LSP 27 in a manner similar to that described with respect to establishing RSVP-TE bypass LSP 26 of FIG. 1, e.g., by sending PATH messages and receiving RESV messages.

When selecting a path on which to establish RSVP-TE bypass LSP 27, PLR router 16A may take into account Shared Risk Link Group (SRLG) associated with the link between itself and the protected node. Specifically, the bypass LSP should avoid traversing links that share one or more SRLGs with the link between itself and the protected node. Also, PLR router 16A should avoid the protected node for node protection. During the SPF calculation, PLR router 16A uses the auto bypass LSP(s) to protect all the prefixes that reside behind the protected ABR. Thus, if the protected ABR 16B fails, PLR router 16A of the protected ABR 16B will re-direct packets on RSVP-TE auto bypass LSP 27 to other-ABR 16E.

PLR router 16A also establishes a targeted LDP session 29 to the identified other-ABR (here, router 16E). PLR router 16A receives an LDP label mapping advertised by the other-ABR 16E via the targeted LDP session 29, and stores the LDP label mapping to its FIB.

In response to PLR router 16A detecting a failure of protected ABR router 16B, PLR router 16A can subsequently send traffic received on LSP 22 onto bypass LSP 27, and, in accordance with its stored forwarding information, PLR router 16A will use a label stack that includes the LDP label learned from the other-ABR 16E via the targeted LDP session 29. PLR router 16A relies on the other-ABR 16E to forward the traffic to MP router 16C by some path determined by other-ABR 16E. The label stack may include an inner label from the LDP label mapping received via the targeted LDP session 29 and an outer label for the RSVP-TE bypass LSP 27. The outer RSVP-TE LSP label L1 may be used by the LSRs in network 14 for forwarding traffic on the RSVP-TE bypass LSP 27 to other-ABR 16E. Although shown in FIG. 2 as only being one hop away from PLR router 16A, in some examples the other-ABR may be multiple hops away from PLR router 16A.

In some examples, PLR router 16A may be configured to provide one or more additional features. In some examples, (a) even if PLR router 16A may receive label mappings from the other-ABR 16E for both inter-area FECs and intra-area FECs, PLR router 16A may retain only the mapping for the inter-area FECs (and may discard all other mappings), and/or (b) even if PLR router 16A receives label mapping from its next next-hops for both inter-area FECs and intra-area FECs, PLR router 16A may retain only the mapping for the intra-area FECs (and may discard all other mappings). However, there can be an exception for rule (a). For instance, if the other-ABR is also the next next-hop (merge point) for a few intra-area FECs, then PLR router 16A should retain from the other-ABR the label mapping for those intra-area FECs.

Further, in some examples PLR router 16A may always use other-ABR 16E for inter-area prefix node protection. That is, PLR router 16A may be configured to automatically determine an other-ABR for each ABR in area 18A that needs node protection. In these examples, each node discovers and establishes RSVP-TE bypass LSPs and targeted LDP sessions to all the ABRs in the area. Moreover, PLR router 16A calculates a respective other-ABR for each of the inter-area prefixes. Thus, if the prefix primary next hop takes a path via ABR 16B, PLR router 16A sets up the backup next hop to take a path via other-ABR 16E. Once PLR router 16A sets up the backup next hop, PLR router 16A constructs the backup next hop label stack with a top label as RSVP-TE bypass LSP label and a bottom label as the prefix's label learned over the targeted LDP session 29 with other-ABR router 16E.

In some examples, PLR router 16A may retain only mappings for intra-area FECs from its next next-hop targeted LDP session, e.g., targeted LDP session 24 from FIG. 1, and only inter-area FECs from the other-ABR targeted LDP session 29, and may discard all other mappings. For example, PLR router 16A may always use other-ABR to protect inter-area traffic. In such a case, LDP executing on PLR router 16A does not have to learn all the FECs over a targeted LDP session such as session 29. For instance, LDP needs to learn only intra-area FECs over the targeted LDP session to the next next-hop and inter-area FECs over the targeted LDP session 19 to the other-ABR 16E. This can be achieved by adding two more application types—(a) Intra-area node protection and (b) Inter-area node protection to the approach described in S. Esale, "Application-aware Targeted LDP," referenced above.

However, for ABR node protection there may be instances when LDP executing on PLR router 16A has to negotiate both the Intra-area node protection and Inter-area node protection application types over the targeted LDP session 29 to the other-ABR, which is also a next next-hop for some intra-area FECs. In this case, both application types can be specified in the negotiation of targeted LDP session 29.

Figure 3:
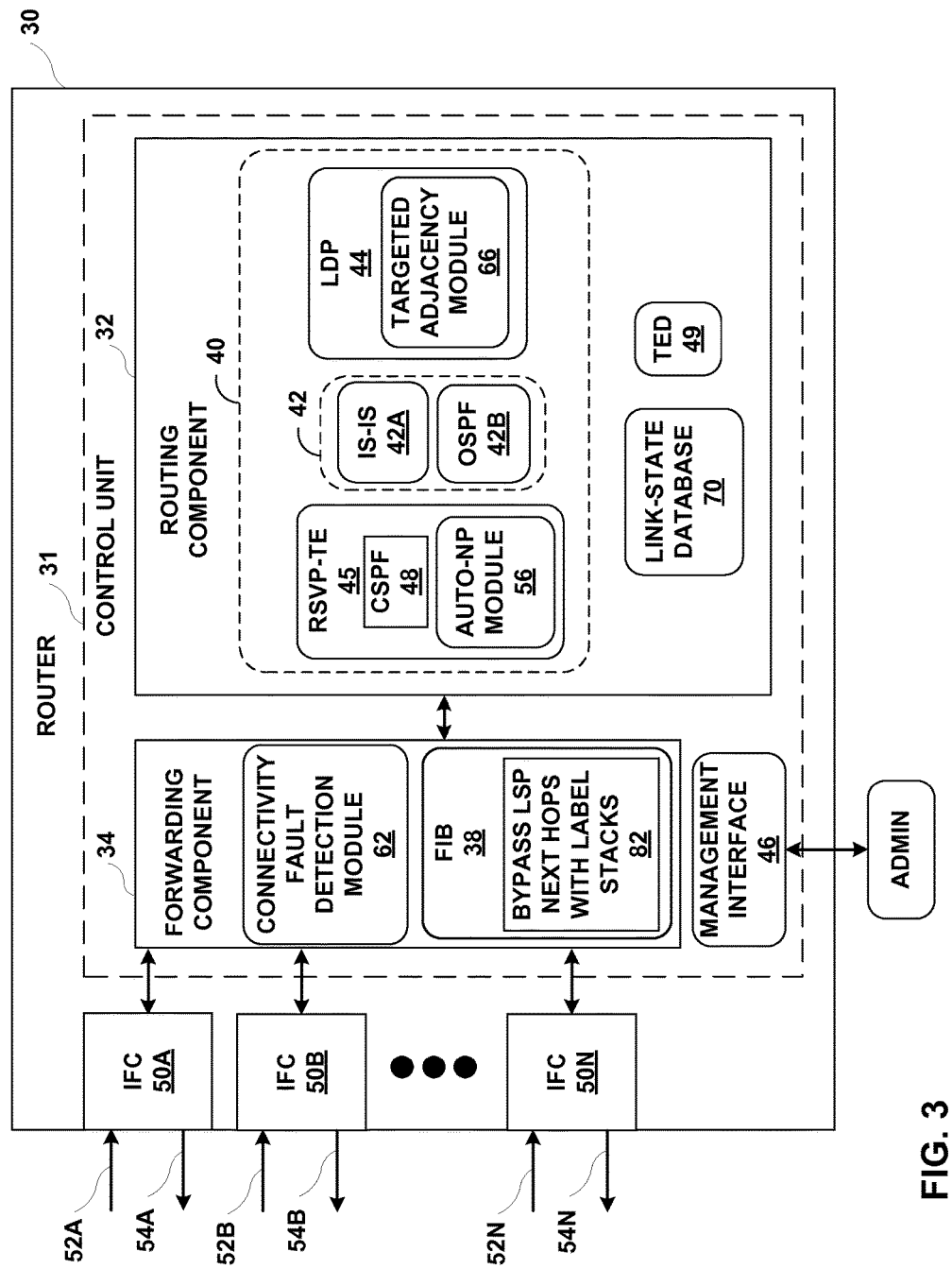
FIG. 3 is a block diagram illustrating an example embodiment of a point of local repair (PLR) network device in accordance with the techniques of this disclosure.

FIG. 3 is a block diagram illustrating an example embodiment of a point of local repair (PLR) network device in accordance with the techniques of this disclosure. PLR router 30 may, for example, represent one or more of routers 16 of FIG. 1, such as PLR router 16A, for example. In this example, PLR router 30 includes a control unit 31 that comprises a routing component 32 and a forwarding component 34. In addition, PLR router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing component 32 primarily provides an operating environment for control plane protocols 40. For example, one or more IGP routing protocols 42, such as Intermediate System to Intermediate System (ISIS) routing protocol 42A, or the Open Shortest Path First (OSPF) routing protocol 42B, maintains Traffic Engineering Database (TED) 49 and/or link state database 70 to reflect the current topology of a network and other network entities to which PLR router 30 is connected. In particular, IGPs 42 update TED 49 and/or link state database 70 to accurately reflect the topology of the network and other entities.

Routing component 32 generates and programs forwarding component 34 with FIB 38 that associates network destinations with specific next hops and corresponding interfaces ports of IFCs 50 in accordance with TED 49 and/or link state database 70. Routing component 32 may generate FIB 38 in the form of a radix tree having leaf nodes that represent destinations within the network, for example. FIB

38 may include label mappings for MPLS LSPs, including next hops with label stacks 82 for bypass LSPs as described below.

Based on FIB 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of PLR router 30 can be found in U.S. Pat. No. 8,339,959, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

PLR router 30 also includes management interface 46 by which an administrator ("ADMIN"), script, or network management system can configure PLR router 30. In some examples, management interface 46 may be presented locally, or may be used for receiving information by way of an Application Programming Interface (API) from a Software Defined Network (SDN) controller or Path Computation Element (PCE), for example.

As shown in FIG. 2, protocols 40 executing within routing component 32 include one or more MPLS protocols for establishing a LSP. For example, RSVP-TE module 45 may generate and maintain a traffic engineering database (TED) 49, including bandwidth reservations for paths associated with MPLS LSPs. Constrained Shortest Path First (CSPF) process 48 computes a shortest path or paths for an MPLS LSP based on specified constraints and bandwidth availability information associated with the links within the network. The constraints and bandwidth availability information associated with the links may have been obtained by IGPs 42. IGPs 42 may, in turn, advertise the calculated bandwidth availability information in TED 49 to other peer routers.

PLR router 30 receives RSVP-TE PATH messages from PE routers 12A and 12C for setting up LSPs 22A and 22B, respectively. In response, RSVP-TE module 45 of router 30 forwards the RSVP-TE PATH messages to router 16B, and also sends RSVP-TE RESV messages back to the ingress routers confirming the reservation of the requested bandwidth. RSVP-TE module 45 may also inform IGPs 42, which in turn can update TED 49 with current available bandwidth information. IGPs 42 may also forward the updated current available bandwidth information to other IGP peers. RSVP-TE module 45 may also store MPLS labels to FIB 38 for LSPs.

In accordance with the techniques of this disclosure, RSVP-TE module 45 includes automatic node protection module 56 ("AUTO-NP MODULE 56"), which is configured to perform the techniques described herein with respect to FIGS. 1-2 and 4-5 for providing intra-area node protection and inter-area node protection. For providing intra-area node protection, automatic node protection module 56, in response to determining that node protection is requested, obtains the network address of each of one or more potential next next hop merge points (e.g., the advertised loopback address obtained via one of IGPs 42) from TED 49 or link state database 70. RSVP-TE module 45 can automatically establish RSVP-TE bypass LSPs along a path computed by CSPF 48 to the next next hop merge points by sending PATH messages and receiving RESV messages.

For inter-area node protection, automatic node protection module 56 of RSVP-TE module 45 determines that a protected node is an ABR on an LSP being established, for which node protection is requested. For example, automatic node protection module 56 can determine whether a protected node is an ABR by consulting link-state database 70, for example. In some examples, the IGP areas in which network routers reside may be specified as a field in route tables maintained by router 30. In response to determining that the protected node is an ABR, RSVP-TE module 45 can identify at least one area border router in the same area as router 30 and the protected node, and automatically establish an RSVP-TE auto bypass LSP to that other-ABR, if a bypass LSP is not yet established.

Label Distribution Protocol (LDP) 44 may send and receive label mapping messages for establishing LSPs, and store learned label mappings to FIB 38. For intra-area node protection, in some examples, LDP module 44 may learn all RSVP-TE bypass LSPs from RSVP-TE module 45, and targeted adjacency module 66 signals a targeted LDP adjacency and targeted LDP session for each next next hop for the RSVP-TE bypass LSPs. For inter-area node protection, in some examples, LDP module 44 learns the RSVP-TE bypass LSP to the other-ABR from RSVP-TE module 45, and targeted adjacency module 66 signals a targeted LDP adjacency and targeted LDP session to the identified other-ABR.

Subsequent to a protected LSP being established, router 30 may in some examples detect a failure condition of a protected node along the LSP, such as protected router 16B on LSP 22 (FIGS. 1 and 2). In some examples, connectivity fault detection module 62 may run a session to a neighboring node, and can detect when the neighboring node fails. In some examples, the session is managed by the kernel of router 30 (not shown), and a routing protocol daemon (RPD) and/or RSVP-TE module 45 is informed by the kernel if there is any change. RSVP-TE module 45 will react depending on its configuration. Otherwise, routing component 32 may do fault detection. For example, one of IGPs 42 of routing component 32 may detect that a neighboring node has failed, e.g., based on the IGP 42 no longer receiving Hello messages on an IGP session with the neighboring node. In some examples, in response to detecting a failure condition of a protected resource between router 30 and a merge point router, connectivity fault detection module 62 informs RSVP-TE module 45 in the control plane of router 30 of the detected condition.

Although illustrated for purposes of example as being positioned in the forwarding component 34 (e.g., in the forwarding plane of router 30), connectivity fault detection module 62 could alternatively be located in the control plane of router 30, such as within routing component 32. In the case of connectivity fault detection module 62 being located in the control plane, connectivity fault detection module 62 may poll the forwarding component 34 for statistics and information, and compare the data received from forwarding component 34 to configured thresholds, for example. In one example, connectivity fault detection module 62 may comprise a software application programming interface (API) in the control plane of router 30 that requests the status of aspects of forwarding component 34, such as next hop utilization statistics, and forwarding component 34 responds by providing the requested statistics. In this case, connectivity fault detection module 62 might perform bookkeeping/accounting of bandwidth in the control plane, for example.

Subsequently, when RSVP-TE module 45 is notified that a protected node has failed, RSVP-TE module 45 may also update FIB 38 to set a next hop along a bypass LSP as the primary next hop, such as by changing weights associated with the next hops in the forwarding information. In some examples, PLR router 30 may also then delete the next hop along the primary LSP from the forwarding state. Examples of updating forwarding state for fast reroute are described in U.S. Pat. No. 8,077,726, entitled, "FAST REROUTE FOR MULTIPLE LABEL SWITCHED PATHS SHARING A SINGLE INTERFACE," issued Dec. 13, 2011, the entire contents of which are incorporated by reference herein.

In response to detecting failure of the protected node, router 30 can subsequently send traffic received on the primary LSP onto a bypass LSP, and router 30 will use a label stack in FIB 38 that includes an LDP label learned C via the targeted LDP session. The label stack may be stored in label stacks 82, and may include an inner LDP label and an outer RSVP-TE label, for example.

Figure 4:
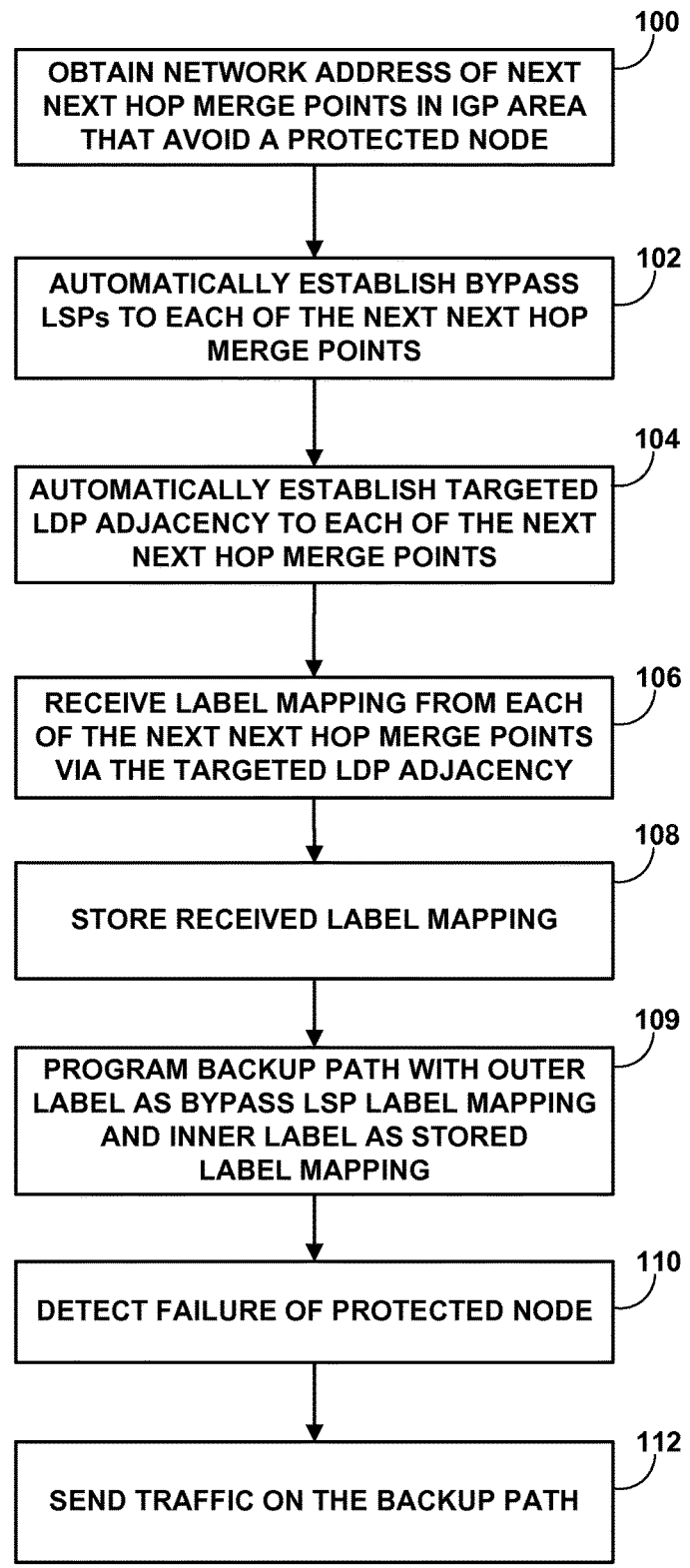
FIGS. 4 and 5 are flowcharts illustrating example operations of network devices in accordance with one or more techniques of this disclosure.

FIG. 4 is a flowchart illustrating example operation of network devices in accordance with the techniques of this disclosure. FIG. 4 will be described with reference to FIGS. 1 and 3 for purposes of example. For example, FIG. 4 refers to a PLR network device, which in one example may be PLR router 16A of FIG. 1.

In the example of FIG. 4, PLR router 16A discovers all possible next next hops (NNHs) of PLR router 16A that are in the same IGP area 12 as PLR router 16A and that avoid the protected router 16B (100). An automatic node protection module 56 of PLR router 16A may be configured to obtain these next next hops from a topology database, e.g., its stored TED or link state database, populated with topology information obtained via IGP link state advertisements (LSAs) exchanged by PLR router 16A with IGP peer routers.

PLR router 16A automatically establishes a bypass LSP to each of the discovered next next hops, if a bypass LSP is not yet established (102). An LDP module of PLR router 16A also signals a targeted LDP session to each of the identified next next hops (104). In some examples, PLR router 16A may establish the bypass LSP and signal the targeted LDP session in parallel. PLR router 16A then obtains an LDP label mapping advertised by MP router 16C via targeted LDP session 24 (106). PLR router 16A stores the label mapping received from MP router 16C to its FIB (108), and programs its FIB with a backup path with a label stack having an outer label as the label for the bypass LSP and an inner label based on the label mapping received via the targeted LDP session (109).

In response to PLR router 16A detecting a failed resource between PLR router 16A and MP router 16C (e.g., failure of protected router 16B, in the example of FIG. 1) (110), PLR router 16A can subsequently send traffic received on LSP 22 onto the backup path programmed to its FIB. PLR router 16A will use the label stack that includes the RSVP-TE bypass LSP label and LDP label L21 learned from its next next hop MP router 16C via the targeted LDP session 24 (112). The label stack may include an inner label L21 and an outer label L1. The outer RSVP-TE LSP label L1 may be used by the LSRs in network 14 for forwarding traffic on the backup path via RSVP-TE bypass LSP 26.

Figure 5:
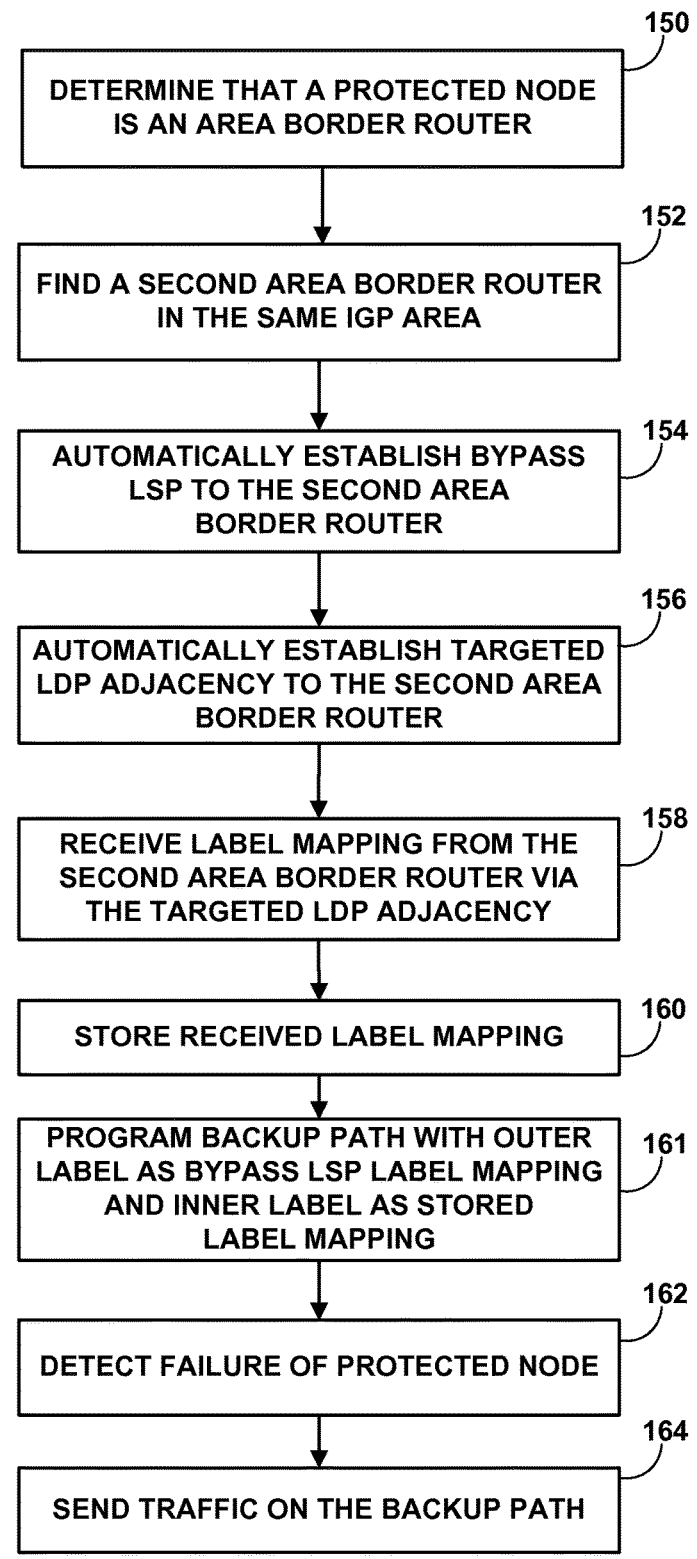

FIG. 5 is a flowchart illustrating example operation of network devices in accordance with the techniques of this disclosure. FIG. 5 will be described with reference to FIGS. 1 and 2 for purposes of example. For example, FIG. 5 refers to a PLR network device, which in one example may be PLR router 16A of FIG. 2.

PLR router 16A identifies a protected node based on local configuration of PLR router 16A, and in the example of FIG. 5, PLR router 16A determines that a protected node is an area border router (150). In response to determining that the protected node is an ABR, PLR router 16A is configured to identify a second ABR ("other-ABR") in the same IGP area as the protected node and PLR router 16A (152). Whether a router is an ABR may be indicated in an LSA advertised on an IGP session between routers, so automatic node protection module 56 of PLR router 16A can determine whether a protected node is an ABR and identify the second ABR by consulting link-state database 70, for example.

PLR router 16A automatically establishes a bypass LSP to the identified second area border router 16E (154). PLR router 16A also automatically establishes a targeted LDP session with the second area border router 16E (156). In some examples, PLR router 16A may establish the bypass LSP and signal the targeted LDP session in parallel. PLR router 16A receives an LDP label mapping advertised by the second ABR 16E via the targeted LDP session (158), and stores the LDP label mapping to its FIB 38 (160). PLR router 16A programs its FIB with a backup path with a label stack having an outer label as the label for the bypass LSP and an inner label based on the label mapping received via the targeted LDP session (161).

In response to PLR router 16A detecting a failed resource between PLR router 16A and MP router 16C (e.g., failure of protected router 16B, in the example of FIG. 1) (162), PLR router 16A can subsequently send traffic received on LSP 22 onto the backup path using the label stack that includes the LDP label L21 learned from its next next hop MP router 16C via the targeted LDP session 24 (164). The label stack may include an inner label L21 and an outer label L1. The outer RSVP-TE LSP label L1 may be used by the LSRs in network 14 for forwarding traffic on the backup path via RSVP-TE bypass LSP 26.

In other examples, LDP may be extended to set up next next-hop targeted sessions. For example, LDP may be extended to advertise next next hop neighbors, allowing PLR router 16A to learn next next hop neighbors by these advertisements (e.g., learned from router 16B). Subsequently, PLR router 16A may establish targeted sessions between PLR router 16A and all the neighbor's neighbors. Further, PLR router 16A may advertise IPv4 and IPv6 label bindings on these targeted sessions for LDP node protection. In addition, PLR router 16A signals RSVP-TE auto-bypass LSP to neighbor's neighbor excluding the neighbor. PLR router 16A calculates next next-hop for each route with the help of either IGP SPF or TED database. So, during the programming of route, PLR router 16A uses the next next-hop label as an inner label and RSVP-TE auto bypass label as an outer tunnel.

In another example, LDP may be extended to learn all neighbors' neighbors. Also, PLR router 16A signals RSVP-TE auto bypass LSPs to neighbors' neighbors as 'backup' LSPs. IGP executing on the PLR router 16A uses this backup LSP for node protection during SPF calculation. LDP uses the same IGP backup next-hop as RSVP-TE auto bypass LSP to program its backup next-hop. This would require few LDP protocol extensions, and either only changes to MPLS or to MPLS and IGP. LDP may have good number of targeted session for node protection. The application aware targeted LDP techniques can be used to control the types of FECs exchanges over the targeted sessions. Inter-area node protection needs either BGP-TE or some other mechanism.

An example of extending LDP for fast reroute in multicast LSPs is described in U.S. Ser. No. 13/467,610, entitled FAST REROUTE USING LOOP FREE ALTERNATE NEXT HOPS FOR MULTIPOINT LABEL SWITCHED PATHS, filed May 9, 2012, the entire contents of which is incorporated by reference herein.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
   by a network device, determining, based on network topology information obtained by an interior gateway protocol (IGP) executed by the network device, that a protected node along a primary label switched path (LSP) is a first area border router at a border of a first IGP area and a second IGP area, wherein the protected node and the network device are positioned in the first IGP area;
   in response to determining that the protected node is a first area border router, by the network device, identifying a second area border router in the first IGP area in which the network device and the protected node are positioned, wherein the second area border router is located at the border of the first IGP area and the second IGP area;
   by the network device, automatically establishing a bypass LSP to the second area border router, wherein the bypass LSP follows a path that avoids the protected node;
   by the network device, automatically establishing a targeted label distribution protocol (LDP) session to the second area border router;
   by the network device, obtaining a label mapping from the second area border router using the targeted LDP session; and
   by the network device, programming stored forwarding information to include a backup path to the second area border router with a label stack having an inner label from the obtained label mapping for the second area border router and an outer label for the bypass LSP to the second area border router.

2. The method of claim 1, further comprising, in response to detecting that the protected node is unresponsive:
   encapsulating network traffic with the label stack; and
   forwarding network traffic on the backup path.

3. The method of claim 1, wherein identifying the second area border router comprises identifying the second area border router based on the network topology information obtained by the IGP.

4. The method of claim 1, wherein establishing a targeted LDP session comprises sending an LDP initialization message that includes a targeted application capability (TAC) type-length-value (TLV) specifying inter-area node protection such that only inter-area Forwarding Equivalence Classes (FECs) will be advertised over the targeted LDP session.

5. The method of claim 1, wherein the bypass LSP comprises a Resource Reservation Protocol with Traffic Engineering extensions (RSVP-TE) bypass LSP, wherein automatically establishing the bypass LSP comprises outputting one or more Resource Reservation Protocol with Traffic Engineering extensions (RSVP-TE) Path message to the second area border router for signaling the RSVP-TE bypass LSP.

6. The method of claim 5, wherein identifying the second area border router comprises obtaining, by an RSVP-TE module of the network device, a network address for reaching the second area border router from the network topology information.

7. The method of claim 1, wherein automatically establishing the bypass LSP comprises selecting a path for the bypass LSP that avoids links having one or more Shared Risk Link Group (SRLG) in common with a link between the network device and the protected node.

8. The method of claim 1, further comprising:
   discovering, by the network device, a plurality of area border routers in the first IGP area other than the second area border router; and
   establishing a respective bypass LSP and targeted LDP session from the network device to each of the plurality of area border routers.

9. The method of claim 8, further comprising:
selecting, by the network device, a third area border router from the plurality of area border routers, the third area border router advertising inter-area reachability to the FEC prefix; and
when a primary next hop for the inter-area FEC prefix takes a path via the first area border router, installing, by the network device, a backup next hop for the inter-area FEC prefix to take a path via the third area border router.

10. The method of claim 1, further comprising:
by the network device, identifying the primary LSP as being bound to a forwarding equivalency class (FEC) prefix for which the first area border router is a next hop,
wherein identifying the second area border router further comprises identifying a second area border router that advertises inter-area reachability to the FEC prefix to which the primary LSP is bound.

11. A network device comprising:
a hardware-based processor;
an interior gateway protocol (IGP) module executing on the hardware-based processor, wherein the IGP module is configured to obtain network topology information;
a Resource Reservation Protocol with Traffic Engineering extensions (RSVP-TE) module executing on the hardware-based processor, wherein the RSVP-TE module is configured to determine, based on the network topology information, that a protected node along a primary label switched path (LSP) is a first area border router at a border of a first IGP area and a second IGP area, wherein the protected node and the network device are positioned in the first IGP area, and in response to determining that the protected node is a first area border router, identify a second area border router in the first IGP area in which the network device and the protected node are positioned, wherein the second area border router is located at the border of the first IGP area and the second IGP area,
wherein the RSVP-TE module is configured to automatically establish a bypass LSP to the second area border router, wherein the bypass LSP follows a path that avoids the protected node; and
a label distribution protocol (LDP) module executing on the hardware-based processor, wherein the LDP module is configured to automatically establish a targeted label distribution protocol (LDP) session to the second area border router, obtain a label mapping from the second area border router using the targeted LDP session, and program stored forwarding information to include a backup path to the second area border router with a label stack having an inner label from the obtained label mapping for the second area border router and an outer label for the bypass LSP to the second area border router.

12. The network device of claim 11, wherein the RSVP-TE module is configured to, in response to detecting that the protected node is unresponsive, encapsulate network traffic with the label stack and forward the encapsulated network traffic on the backup path.

13. The network device of claim 11, wherein the RSVP-TE module is configured to identifying the second area border router based on the network topology information obtained by the IGP module.

14. The network device of claim 11, wherein the LDP module is configured to send an LDP initialization message that includes a targeted application capability (TAC) type-length-value (TLV) specifying intra-area node protection such that only intra-area Forwarding Equivalence Classes (FECs) will be advertised over the targeted LDP session.

15. The network device of claim 11, wherein the bypass LSP comprises a Resource Reservation Protocol with Traffic Engineering extensions (RSVP-TE) bypass LSP, wherein the RSVP-TE module outputs one or more RSVP-TE Path message to the second area border router for signaling the RSVP-TE bypass LSP.

16. The network device of claim 11, wherein the RSVP-TE module is configured to select a path for the bypass LSP that avoids links having one or more Shared Risk Link Group (SRLG) in common with a link between the network device and the protected node.

17. The network device of claim 11, wherein the RSVP-TE module is configured to discover a plurality of area border routers in the first IGP area other than the second area border router; and establish a respective bypass LSP to each of the plurality of area border routers, and wherein the LDP module is configured to establish a respective targeted LDP session from the network device to each of the plurality of area border routers.

18. The network device of claim 11,
wherein the RSVP-TE module is configured to select a third area border router from the plurality of area border routers for an inter-area prefix, and
wherein the RSVP-TE module is configured to, when a primary next hop for the inter-area prefix takes a path via the first area border router, install a backup next hop for the inter-area prefix to take a path via the third area border router.

19. A non-transitory computer-readable storage medium comprising instructions for causing a programmable processor of a network device to:
determine, based on network topology information obtained by an interior gateway protocol (IGP) executed by the network device, that a protected node along a primary label switched path (LSP) is a first area border router at a border of a first IGP area and a second IGP area, wherein the protected node and the network device are positioned in the first IGP area;
in response to determining that the protected node is a first area border router, identify a second area border router in the first IGP area in which the network device and the protected node are positioned, wherein the second area border router is located at the border of the first IGP area and the second IGP area;
automatically establish a bypass LSP to the second area border router, wherein the bypass LSP follows a path that avoids the protected node;
automatically establish a targeted label distribution protocol (LDP) session to the second area border router;
obtain a label mapping from the second area border router using the targeted LDP session; and
program stored forwarding information to include a backup path to the second area border router with a label stack having an inner label from the obtained label mapping for the second area border router and an outer label for the bypass LSP to the second area border router.

* * * * *